US011897211B2

(12) United States Patent
Audinwood et al.

(10) Patent No.: US 11,897,211 B2
(45) Date of Patent: Feb. 13, 2024

(54) METHOD AND APPARATUS FOR AUTOMATIC EXTRUDATE LOADING AND ALIGNMENT

(71) Applicant: Corning Incorporated, Corning, NY (US)

(72) Inventors: Colby William Audinwood, Big Flats, NY (US); Brian Stephen Banks, Corning, NY (US); Stephen Andrew Campbell, Corning, NY (US); John Christian Duroe, Big Flats, NY (US); Dustin Andrew Jochum, Corning, NY (US); Anthony Nicholas Rodbourn, Avoca, NY (US); Gary Yaw, Horseheads, NY (US)

(73) Assignee: Corning Incorporated, Corning, NY (US)

(*) Notice: Subject to any disclaimer, the term of this patent is extended or adjusted under 35 U.S.C. 154(b) by 881 days.

(21) Appl. No.: 16/788,915

(22) Filed: Feb. 12, 2020

(65) Prior Publication Data

US 2020/0262161 A1     Aug. 20, 2020

Related U.S. Application Data

(60) Provisional application No. 62/805,652, filed on Feb. 14, 2019.

(51) Int. Cl.
*B29C 48/355*     (2019.01)
*B29C 71/00*     (2006.01)
(Continued)

(52) U.S. Cl.
CPC ........ *B29C 71/0072* (2013.01); *B29C 48/355* (2019.02); *B29C 48/92* (2019.02);
(Continued)

(58) Field of Classification Search
None
See application file for complete search history.

(56) References Cited

U.S. PATENT DOCUMENTS 7,238,309 B2 * 7/2007 Adriaansen ............. B29C 48/92
264/40.1
7,943,077 B2 * 5/2011 Sansoucy .............. B29C 45/261
264/328.1

(Continued)

*Primary Examiner* — Jacob T Minskey
*Assistant Examiner* — Adrien J Bernard
(74) *Attorney, Agent, or Firm* — Joseph M. Homa

(57) ABSTRACT

Disclosed herein is a method and apparatus for automatic extrudate loading and alignment. An extrudate handling system includes a head end assembly and an imaging device (which may be part of the head end assembly). The imaging device is configured to image an end face of an extrudate, and generate, during translation of the extrudate, an imaging output signal indicative of a rotational position of the end face of the extrudate. The head end assembly includes a rotational effector to rotate the extrudate during translation thereof and a fixed effector rotationally fixed relative to a track. The extrudate handling system is able to determine the rotational position of the web angle of the extrudate and precisely adjust the rotational position while linearly translating the extrudate along the track. The extrudate handling system provides greater accuracy, reduced costs, and improved results.

21 Claims, 13 Drawing Sheets

(51) Int. Cl.
*B29C 48/92* (2019.01)
*B29C 48/06* (2019.01)

(52) U.S. Cl.
CPC .... *B29C 48/06* (2019.02); *B29C 2948/92076* (2019.02); *B29C 2948/92438* (2019.02); *B29C 2948/92571* (2019.02); *B29C 2948/92933* (2019.02)

(56) References Cited

U.S. PATENT DOCUMENTS

| | | | |
|---|---|---|---|
| 8,647,099 B2* | 2/2014 | Duroe | B28B 11/166 |
| | | | 425/135 |
| 9,849,619 B2* | 12/2017 | Yonesato | B29C 43/08 |
| 10,421,213 B2* | 9/2019 | Kimata | B28B 3/26 |
| 2011/0210473 A1 | 9/2011 | Duroe | |

* cited by examiner

METHOD AND APPARATUS FOR AUTOMATIC EXTRUDATE LOADING AND ALIGNMENT

This application This application claims the benefit of priority under 35 U.S.C. § 119 of U.S. Provisional Application No. 62/805,652 filed on Feb. 14, 2019, the content of which is incorporated herein by reference in its entirety.

BACKGROUND

The disclosure relates to extrudate placement and transport, and more particularly to a method and apparatus for automatic loading and alignment of an extrudate onto a tray.

Ceramic extrudates are used in a wide variety of applications, such as substrates for automotive exhaust catalytic converters, particulate traps within diesel and gasoline engines, chemical filtration processes, and the like. The manufacturing process for these extrudates typically includes transfer of a wet extrudate (i.e., wet material, wet log, etc.) along a manufacturing line after being extruded from an extrusion die. In particular, the manufacturing process includes transport of the extrudate onto a dryer tray for subsequent transportation to a dryer. An extrudate may include a cylindrical outer wall with continuous internal cross-members. For example, in a rectangular celled product the internal cross-members are arranged in perpendicularly arranged rows and columns to form a honeycomb-like matrix. In a hexagonal celled product the internal cross-members form a hexagonal pattern.

SUMMARY

Disclosed herein is a method and apparatus for automatic extrudate loading and alignment. In particular, disclosed is an extrudate handling system including a head end assembly and an imaging device (which may be part of the head end assembly). The imaging device is configured to image an end face of an extrudate, and generate, during translation of the extrudate, an imaging output signal indicative of a rotational position of the end face of the extrudate. The head end assembly includes a body, a rotational effector, and a fixed effector. The head end assembly is configured to linearly translate the extrudate along the central longitudinal axis after engagement of the rotational effector with the extrudate. The body is linearly translatable along a track and rotationally fixed relative to the track. The rotational effector is configured to, during translation of the extrudate, rotate the extrudate around a central longitudinal axis of the extrudate responsive to the at least one imaging output signal. The fixed effector is rotationally fixed relative to the body and configured to engage the extrudate, after rotation of the extrudate by the rotational effector, to rotationally fix the extrudate around the central longitudinal axis of the extrudate. The extrudate handling system is able to determine the rotational position of the web angle of the extrudate and precisely adjust the rotational position (e.g., based on web angle deviation, tray variability, fixture variability, etc.). The extrudate handling system provides enhanced web angle positional accuracy, reduced web angle positional variation, improved matching of extrudate web angle to angular position of a drying tray, increased extrudate throughput, reduction in scrap, and/or reduced labor expenditures, etc.

In an aspect, the present disclosure relates to an extrudate handling system comprising at least one imaging device and at least one rotational effector. The at least one imaging device is configured to image an end face of an extrudate and generate, during linear translation of the extrudate, at least one imaging output signal indicative of a rotational position of the end face of the extrudate. The at least one rotational effector is configured to, during translation of the extrudate, rotate the extrudate around a central longitudinal axis of the extrudate responsive to the at least one imaging output signal.

In certain embodiments, the at least one rotational effector is configured to rotate the extrudate to vertically orient columns of an internal matrix of the extrudate. In certain embodiments, the at least one rotational effector is configured to rotate the extrudate to align an extrudate web angle of the extrudate to a predetermined web angle. In certain embodiments, the extrudate handling system is configured to determine a difference between an average of a predetermined number of web angles to a desired target value, and generate additional input based on the difference for inclusion into a future web angle correction solution. In certain embodiments, the extrudate handling system is configured to linearly translate the extrudate onto a dryer tray. In certain embodiments, the extrudate handling system further comprises at least one tray sensor configured to sense a tilt of the dryer tray and generate at least one sensing output signal indicative of the tilt of the dryer tray. The at least one rotational effector is configured to, during translation of the extrudate, rotate the extrudate around a central longitudinal axis of the extrudate responsive to the at least one sensing output signal. In certain embodiments, the extrudate comprises a ceramic or ceramic-forming material.

In certain embodiments, the at least one imaging device is further configured to translate concurrently with the end face of the extrudate. In certain embodiments, the imaging device includes at least one of a leveling device, a gimbal, or a gyroscope. In certain embodiments, the extrudate handling system further comprises a head end assembly comprising a body linearly translatable along a track and rotationally fixed relative to the track, wherein the at least one rotational effector is rotationally movable relative to the body. In certain embodiments, the at least one rotational effector comprises at least one pin that extends at least partially into the extrudate. In certain embodiments, the head end assembly further comprises the imaging device, and the imaging device is attached to the body.

In another aspect, the present disclosure relates to an extrudate handling system comprising a head end assembly. The head end assembly comprises a body, at least one rotational effector, and a fixed effector. The body is linearly translatable along a track and rotationally fixed relative to the track. The at least one rotational effector is rotationally movable relative to the body and configured to rotate an extrudate around a central longitudinal axis of the extrudate. The fixed effector is rotationally fixed relative to the body and configured to engage the extrudate, after rotation of the extrudate by the at least one rotational effector, to rotationally fix the extrudate around the central longitudinal axis of the extrudate. The head end assembly is configured to linearly translate the extrudate along the central longitudinal axis after engagement of the at least one rotational effector with the extrudate.

In certain embodiments, the at least one rotational effector is configured to rotate the extrudate to vertically orient columns of an internal matrix of the extrudate. In certain embodiments, the at least one rotational effector is configured to rotate the extrudate to align an extrudate web angle of the extrudate to a predetermined web angle. In certain embodiments, the extrudate handling system is configured to determine a difference between an average of a predetermined number of web angles to a desired target value, and generate additional input based on the difference for inclusion into a future web angle correction solution. In certain embodiments, the extrudate handling system is configured to linearly translate the extrudate onto a dryer tray. In certain embodiments, the extrudate handling system further comprises at least one tray sensor configured to sense a tilt of the dryer tray and generate at least one sensing output signal indicative of the tilt of the dryer tray. The at least one rotational effector is configured to, during translation of the extrudate, rotate the extrudate around a central longitudinal axis of the extrudate responsive to the at least one sensing output signal. In certain embodiments, the extrudate comprises a ceramic or ceramic-forming material.

In certain embodiments, the extrudate handling system further comprises an air bearing surface over which the extrudate linearly translates. In certain embodiments, the at least one rotational effector comprises a left rotational effector configured to engage a left side of the extrudate and a right rotational effector configured to engage a right side of the extrudate, and the left rotational effector and the right rotational effector are oriented toward one another. In certain embodiments, the at least one rotational effector comprises at least one pin configured to extend at least partially into the extrudate. In certain embodiments, the fixed effector is configured to vertically engage the extrudate. In certain embodiments, the fixed effector comprises a pin configured to extend at least partially into the extrudate.

In certain embodiments, the extrudate handling system further comprises at least one imaging device configured to image an end face of the extrudate, and generate, during linear translation of the extrudate, at least one imaging output signal indicative of a rotational position of the end face of the extrudate. In certain embodiments, the head end assembly further comprises the at least one imaging device attached to the body.

In another aspect, the present disclosure relates to a method of handling an extrudate comprising linearly translating an extrudate in a direction substantially parallel to a central longitudinal axis of the extrudate, and rotating the extrudate around the central longitudinal axis of the extrudate during linear translation of the extrudate responsive to at least one imaging output signal indicative of a rotational position of an end face of the extrudate.

In certain embodiments, the rotating the extrudate includes rotating the extrudate to vertically orient columns of an internal matrix of the extrudate. In certain embodiments, the rotating the extrudate includes rotating the extrudate to align an extrudate web angle of the extrudate to a predetermined web angle. In certain embodiments, the method further comprises determining, by an extrudate handling system, a difference between an average of a predetermined number of web angles to a desired target value, and generate, by the extrudate handling system, additional input based on the difference for inclusion into a future web angle correction solution. In certain embodiments, the method further comprises translating the extrudate onto a dryer tray after the rotating of the extrudate. In certain embodiments, the rotating the extrudate includes rotating the extrudate responsive to at least one sensing output signal indicative of a tilt of the dryer tray.

In certain embodiments, the method further comprises imaging the end face of the extrudate during linear translation of the extrudate, and electronically determining a web angle of the extrudate. In certain embodiments, the method further comprises electronically determining a rotational correction of the extrudate. In certain embodiments, the rotating of the extrudate is responsive to the determined rotational correction. In certain embodiments, the method further comprises sensing, by a sensor, an end of the extrudate, and engaging the extrudate proximate to the end of the extrudate. In certain embodiments, the method further comprises rotationally fixing the extrudate while linearly translating the extrudate and after the rotating of the extrudate. In certain embodiments, the method further comprises retracting at least one pin of a rotational effector engaged with the extrudate while at least one pin of a fixed effector remains engaged with the extrudate.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1A:
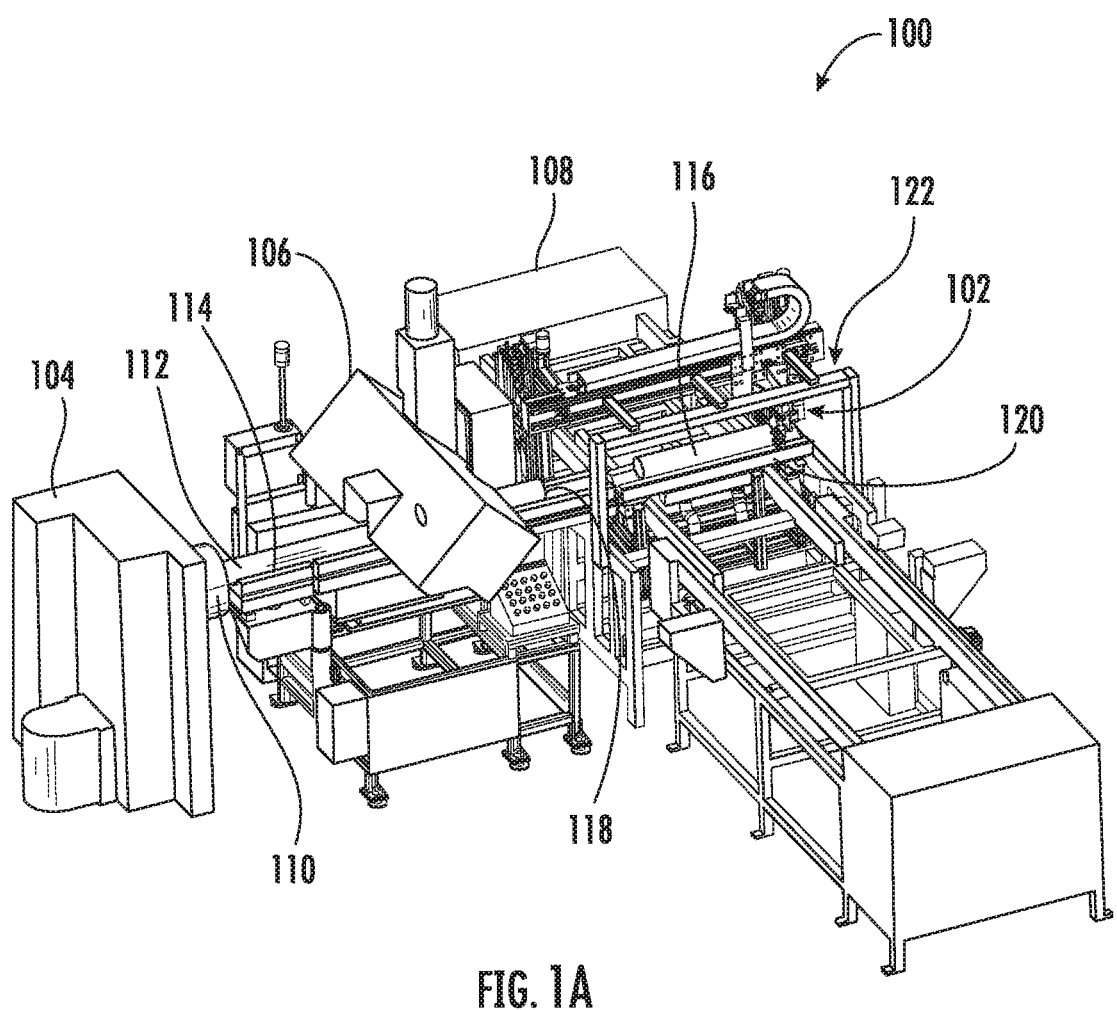
FIG. 1A is a perspective view of an extrusion system including an extrudate handling system.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Disclosed herein is a method and apparatus for automatic extrudate loading and alignment. In particular, disclosed is an extrudate handling system including a head end assembly and an imaging device (which may be part of the head end assembly). The imaging device is configured to image an end face of an extrudate, and generate, during translation of the extrudate, an imaging output signal indicative of a rotational position of the end face of the extrudate. The head end assembly includes a body, a rotational effector, and a fixed effector. The head end assembly is configured to linearly translate the extrudate along the central longitudinal axis after engagement of the rotational effector with the extrudate. The body is linearly translatable along a track and rotationally fixed relative to the track. The rotational effector is configured to, during translation of the extrudate, rotate the extrudate around a central longitudinal axis of the extrudate responsive to the at least one imaging output signal. The fixed effector is rotationally fixed relative to the body and configured to engage the extrudate, after rotation of the extrudate by the rotational effector, to rotationally fix the extrudate around the central longitudinal axis of the extrudate. The extrudate handling system is able to determine the rotational position of the web angle of the extrudate and precisely adjust the rotational position (e.g., based on web angle deviation, tray variability, fixture variability, etc.). The extrudate handling system provides enhanced web angle positional accuracy, reduced web angle positional variation, improved matching of extrudate web angle to angular position of a drying tray, increased extrudate throughput, reduction in scrap, and/or reduced labor expenditures, etc.

Figure 1B:
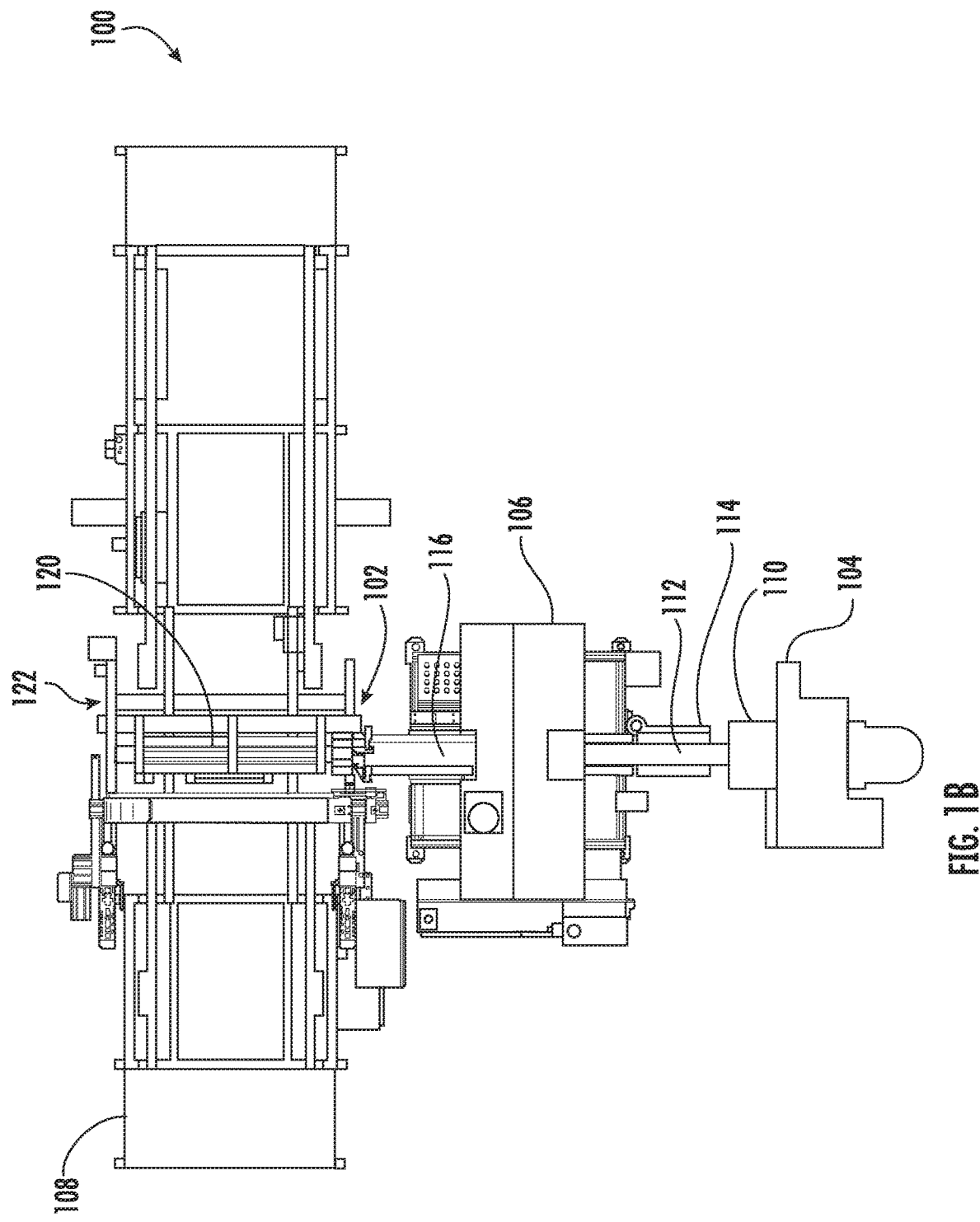
FIG. 1B is a top view of the extrusion system of FIG. 1A.
Figure 1C:
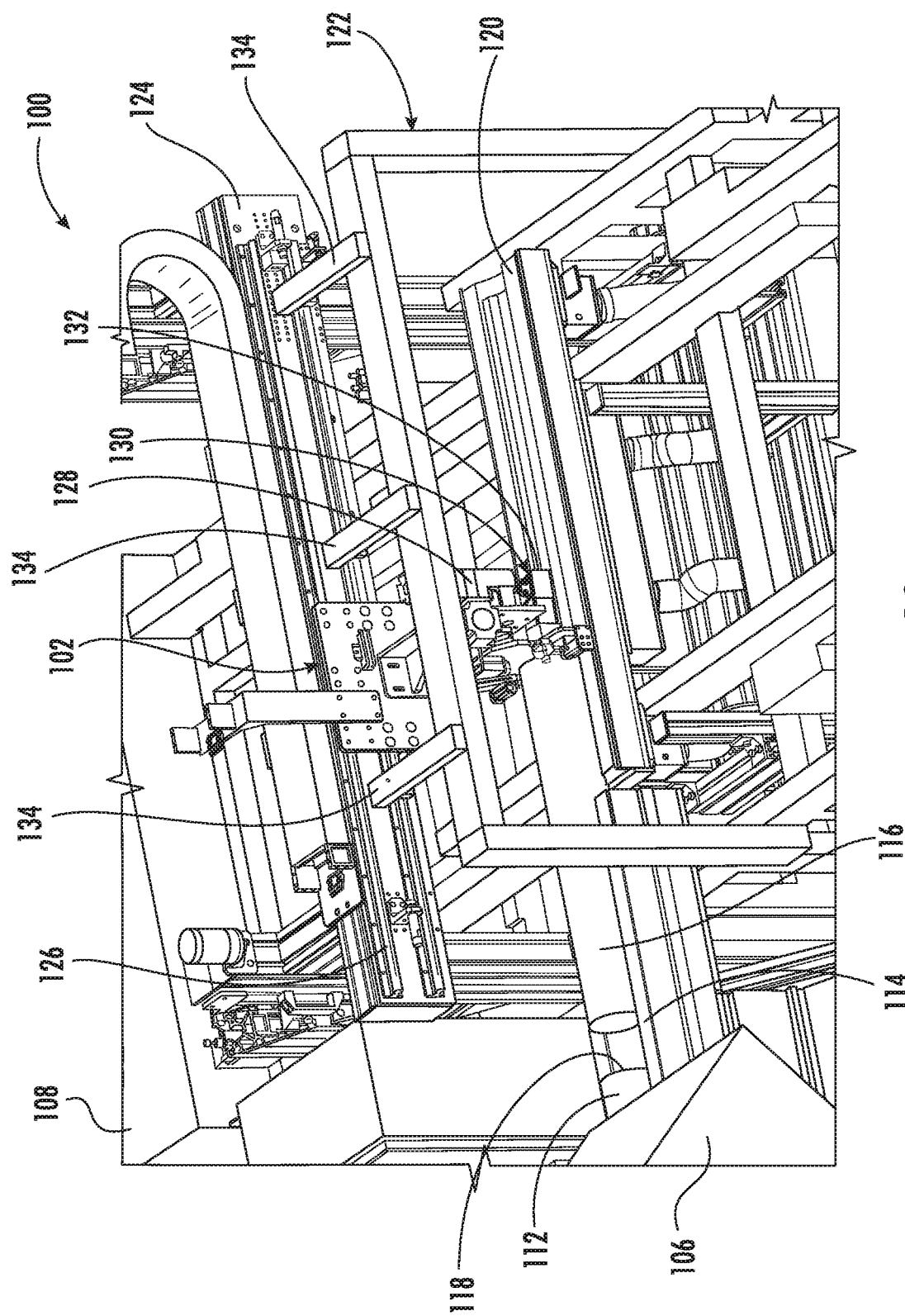
FIG. 1C is a perspective view of the extrudate handling system of FIG. 1A.

FIGS. 1A-1C are perspective views of an extrusion system 100 including an extrudate handling system 102. In particular, the extrusion system 100 (which may also be referred to herein as an extrudate transport apparatus) includes an extrusion apparatus 104 (which may also be referred to herein as an extruder), a wet saw assembly 106 (which may also be referred to herein as a wet saw), the extrudate handling system 102, and a conveyor apparatus 108 (which may also be referred to herein as a conveyor).

The extrusion apparatus 104 has an extrusion die 110 configured to form wet extrudate material 112 onto an extrudate support channel 114. In certain embodiments, the wet extrudate material 112 is a wet ceramic or ceramic-forming material. In certain embodiments, the wet extrudate material 112 is a ceramic or ceramic-forming material and comprises alumina, silica, talc, clay, titania, magnesium, aluminum titanate, cordierite, silicon carbide (SiC), mullite, or any other suitable ceramic or ceramic-forming material.

The wet saw assembly 106 cuts a portion from the wet extrudate material 112 to form a wet extrudate 116 (which may also be referred to herein as an extrudate, log, green body, segment, etc.). In other words, the wet extrudate material 112 is extruded onto the extrudate support channel 114, and then the wet extrudate material 112 translates into a wet saw assembly 106, which cuts the wet extrudate material 112 to form a wet extrudate or green part 116.

In certain embodiments, the extrudate handling system 102 captures a leading end 118 of the wet extrudate material 112 before the wet extrudate material 112 is cut to form the extrudate 116. In this way, the extrudate handling system 102 engages and captures the leading end 118 of the wet extrudate material 112 before the wet extrudate 116 has an opportunity to deviate from an approximately vertical orientation (relative to gravity) as delivered from the extrusion apparatus 104.

Once the extrudate 116 is cut, the extrudate handling system 102 transports the extrudate 116 onto a dryer tray 120 while precisely maintaining a vertical orientation of a web angle of the extrudate 116. The extrudate support channel 114 and/or the extrudate handling system 102 include an air bearing surface over which the extrudate 116 linearly translates. In this way, the extrudate 116 linearly translates along an air bearing path from the extrusion apparatus 104 to the dryer tray 120. When the extrudate 116 is positioned on the dryer tray 120, the air bearing is shut off and the extrudate 116 rests on the dryer tray 120.

Referring to FIG. 1C, the extrudate handling system 102 includes a frame assembly 122 including a gantry 124 (which may also be referred to as a gantry drive system) with a horizontal track 126. The horizontal track is generally aligned (i.e., parallel to) the linear path of the extrudate 116, the extrudate support channel 114, and/or the dryer tray 120. The extrudate handling system 102 includes a head end assembly 128 mounted on and linearly translatable on the track 126 and an alignment system 130. The gantry 124 may include one or more linear actuators (e.g., servo motors) and gear assemblies to translate the head end assembly 128 along the track 126.

The head end assembly 128 engages the extrudate 116 and translates the extrudate 116 onto the dryer tray 120. The alignment system 130 communicates with the head end assembly 128 to orient and rotationally adjust (i.e., rotationally reposition) the extrudate 116 for precise vertical alignment of the extrudate 116 as the extrudate 116 is transported by the head end assembly 128 and placed from the extrudate support channel 114 onto the dryer tray 120.

The alignment system 130 visually monitors the orientation of the extrudate 116 and/or the dryer tray 120 to automatically precisely orient the web angle of the extrudate 116 relative to gravity (e.g., to orient internal columns of the extrudate vertically). In particular, the alignment system 130 includes an imaging device 132 (which may be part of or separate from the head end assembly 128) and/or a tray sensor 134 (illustrated here as a plurality of sensors). The imaging device 132 is configured to image an end face of the extrudate 116 and generate, during linear translation of the extrudate 116, at least one imaging output signal indicative of a rotational position of an end face of the extrudate 116. In certain embodiments, the imaging device 132 also images the end face of the extrudate 116 after the extrudate 116 is resting on the dryer tray 120 to provide feedback to the alignment system 130 and incorporate such feedback into future calculations in the placement of other extrudates 116.

The tray sensors 134 (e.g., distance sensors) are configured to sense a tilt of the dryer tray 120 and generate at least one sensing output signal indicative of the tilt of the dryer tray 120. In certain embodiments, the tray sensors 134 are positioned above the dryer tray 120. The tray sensors 134 are configured to measure the tilt (e.g., relative to gravity and/or relative to horizon, etc.) of the dryer tray 120 when in the loading position (as dryer trays 120 have variability among each other). Accordingly, the degree and direction of tilt of the dryer tray 120 is factored into the web angle correction by the head end assembly 128. Once the extrudate 116 is positioned on the dryer tray 120, the conveyor system 108 moves the dryer tray 120 to the dryer.

In this way, the extrusion system 100, and particularly the extrudate handling system 102, provides positive control of the extrudate 116 and makes precise angular adjustments. Any variability of the dryer tray 120 and/or positioning of the dryer tray 120 in the loading position is measured and counteracted. Further, the extrusion system 100 is entirely automated, thereby eliminating any operator variability, reducing labor costs, and increasing production rate.

Figure 2A:
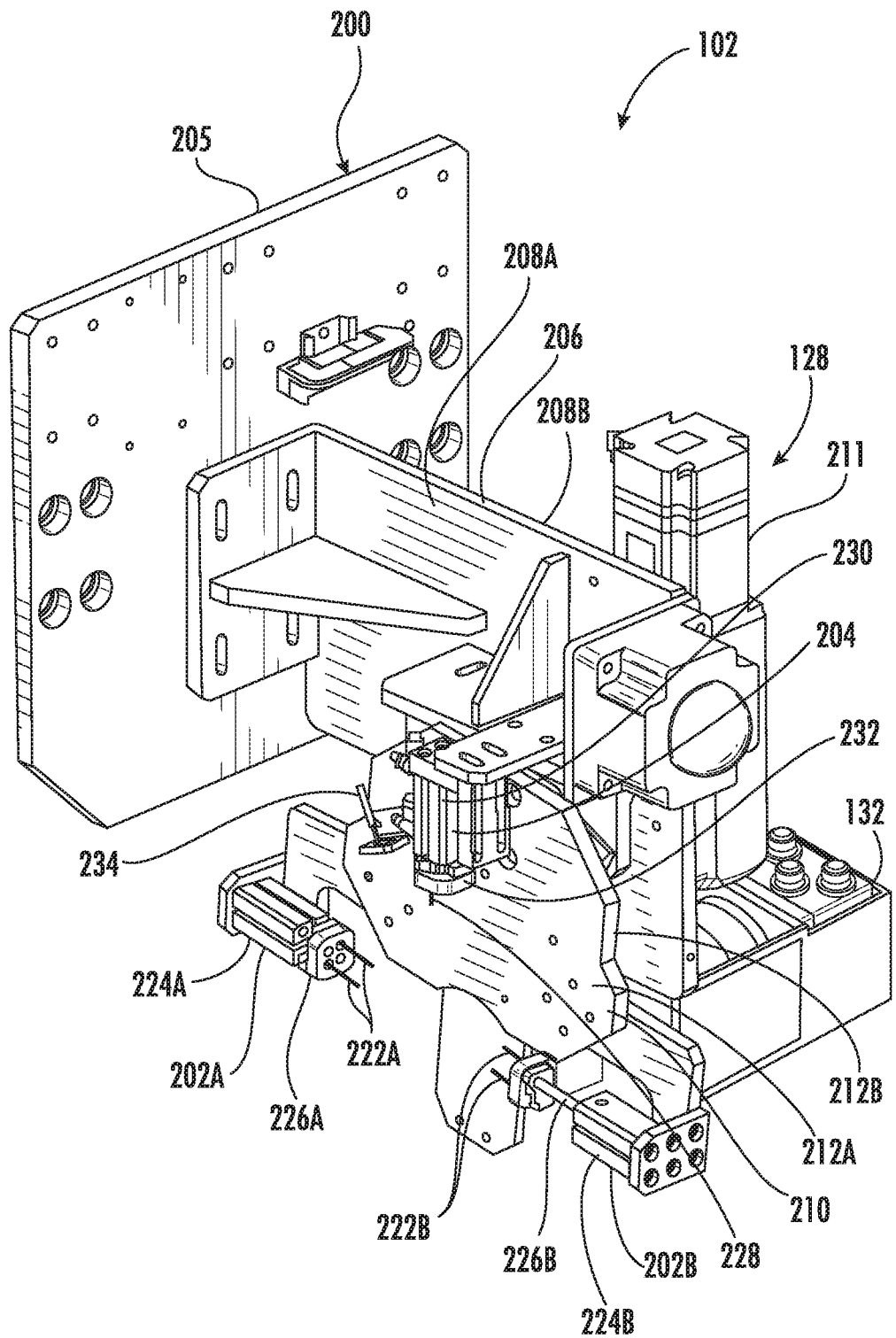
FIG. 2A is a front perspective view of the head end assembly of the extrudate handling system of FIGS. 1A-1C.
Figure 2B:
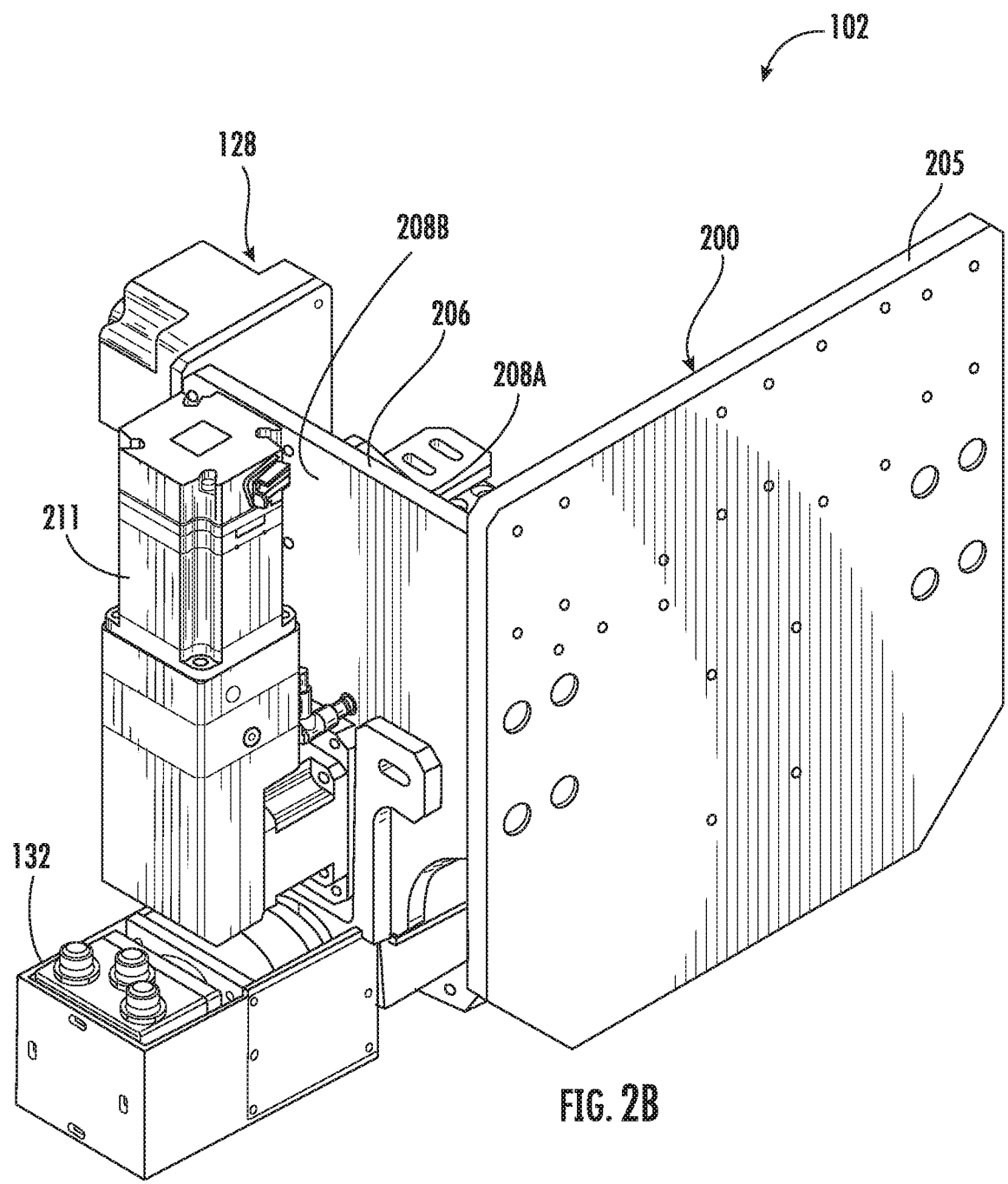
FIG. 2B back perspective view of the head end assembly of the extrudate handling system of FIG. 2A.
Figure 2C:
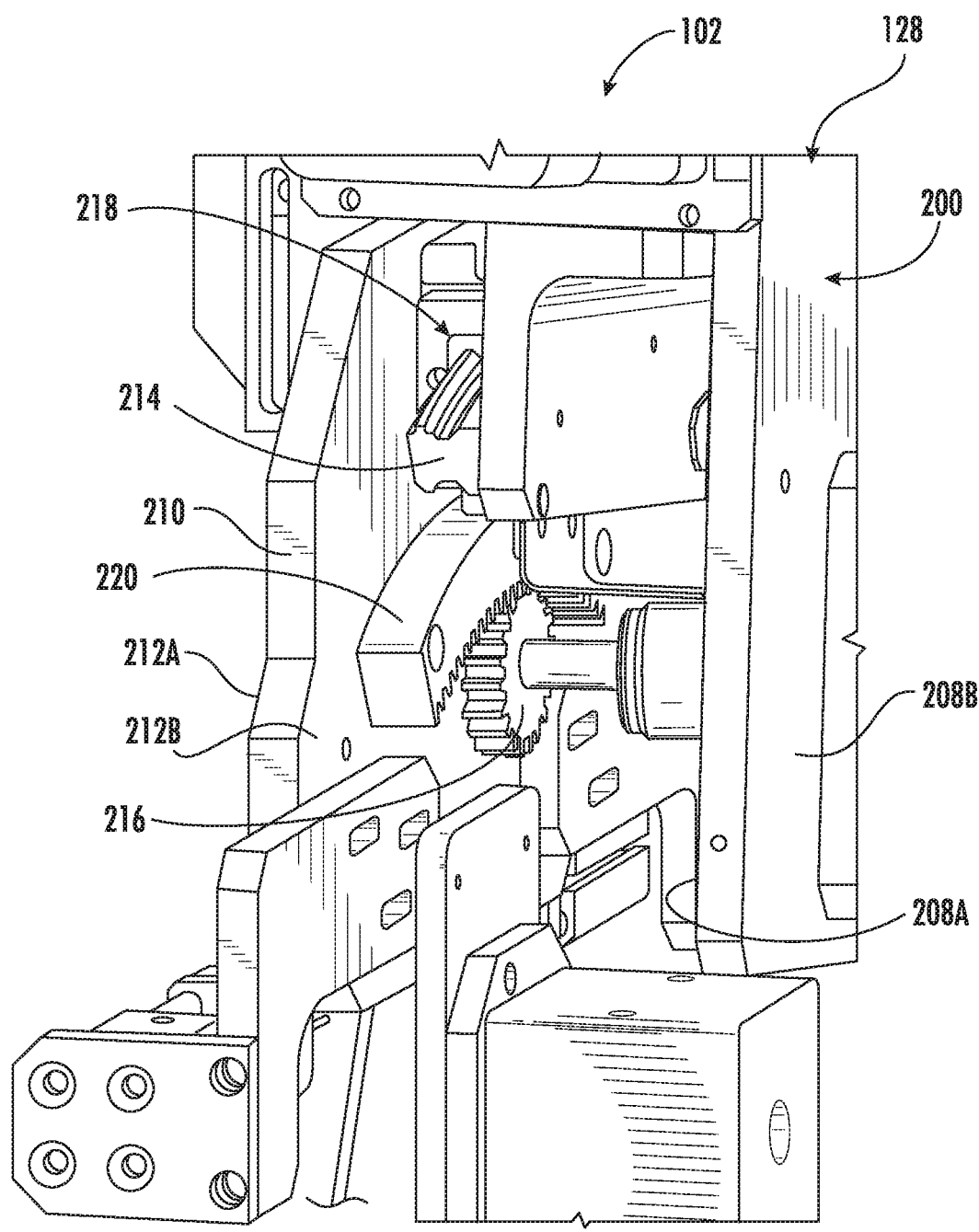
FIG. 2C is a perspective view of a side of the head end assembly of the extrudate handling system of FIG. 2A.

FIGS. 2A-2C are views of the head end assembly 128 of the extrudate handling system 102 of FIGS. 1A-1C. As noted above, the extrudate handling system 102 is configured to linearly translate the extrudate 116 onto a dryer tray 120 (see FIG. 1A-1B). The head end assembly 128 includes a body 200, a left rotational effector 202A, a right rotational effector 202B, and a fixed effector 204. In certain embodiments, the head end assembly 128 includes the imaging device 132. In other embodiments, the imaging device 132 is separate from the head end assembly 128.

The body 200 is linearly translatable along the horizontal track 126 (see FIGS. 1A-1C) and rotationally fixed relative to the horizontal track 126. In certain embodiments, the imaging device 132 is attached to the body 200. The body 200 includes a mounting plate 205 and an arm 206 perpendicularly attached to and extending from the mounting plate 205. The arm 206 includes a first side 208A and a second side 208B opposite the first side 208A. A rotating plate 210 is rotationally engaged with the arm 206 on the first side 208A of the arm 206. The imaging device 132 is mounted on the second side 208B of the arm 206. Further, a servo driven rotation mechanism 211 (e.g., servo motor and gear box) is mounted on the second side 208B of the arm 206. The rotating plate 210 includes a first side 212A and a second side 212B opposite the first side 212A.

Referring to FIG. 2C, the arm 206 includes a tongue 214 and an output gear 216 attached to the first side 208A of the arm 206. The tongue 214 is arced or curved. The output gear 216 is mechanically coupled to the servo driven rotation mechanism 211 (see FIG. 2A). The rotating plate 210 includes a groove 218 and a rack 220 attached to the second side 212B of the rotating plate 210. The tongue 214 of the arm 206 is slidably positioned within the groove 218 of the rotating plate 210. Accordingly, the rotating plate 210 is mounted to and rotationally attached to the arm 206, such that the groove 218 is able to slide along the curvature of the tongue 214. The output gear 216 of the motor is engaged with the rack 220 of the rotating plate 210. Accordingly, rotation of the output gear 216 forces movement of the rack 220, thereby causing rotation of the rotating plate 210 relative to the arm 206.

The left and right rotational effectors 202A, 202B are rotationally movable relative to the body 200. For illustrative purposes, in FIG. 2A the left rotational effector 202A is in the retracted position and the right rotational effector 202B is in the extended position. The left rotational effector 202A includes at least one side pin 222A that extends at least partially into the extrudate 116. In particular, the left rotational effector 202A includes a base 224A and an extendable arm 226A, with a plurality of side pins 222A attached to an end of the extendable arm 226A. The extendable arm 226A is extendable and retractable relative to the base 224A. In this way, movement of the extendable arm 226A from a retracted position to an extended position moves the plurality of side pins 222A into the extrudate 116. Similarly, the right rotational effector 202B includes a base 224B and an extendable arm 226B, with a plurality of side pins 222B attached to an end of the extendable arm 226B. The extendable arm 226B is extendable and retractable relative to the base 224B. In this way, movement of the extendable arm 226B from a retracted position to an extended position moves the plurality of side pins 222B into the extrudate 116.

The left rotational effector 202A and the right rotational effector 202B are oriented toward one another. In other words, the left rotational effector 202A and the right rotational effector 202B are aligned with one another. The distance between the side pins 222A of the left rotational effector 202A and the side pins 222B of the right rotational effector 202A is greater when both are in the retracted position than when both are in the extended position. In this way, the left rotational effector 202A is configured to engage a left side of the extrudate 116 and the right rotational effector 202B is configured to engage a right side of the extrudate 116.

The left and right rotational effectors 202A, 202B are configured to, during translation of the extrudate 116, rotate the extrudate around a central longitudinal axis of the extrudate 116 responsive to the at least one imaging output signal of the imaging device 132 and/or at least one sensing output signal of the tray sensors 134. The left and right rotational effectors 202A, 202B are configured to rotate the extrudate 116 to vertically orient columns of an internal matrix of the extrudate 116 relative to gravity and/or to align a web angle of the extrudate 116 to a predetermined web angle relative to gravity. In particular, to rotate the extrudate 116, the left and right rotational effectors 202A, 202B engage the extrudate 116, and then the servo driven rotation mechanism 211 drives the output gear 216 to rotate the rotating plate 210 (and left and right rotational effectors 202A, 202B) relative to the arm 206. Unlike other configurations, the head end assembly 128 captures and controls the extrudate 116. Insertion of the side pins 222A, 222B into the leading end 118 of the extrudate 116 provides the positive control necessary to accurately evaluate and correct the web angle of the extrudate 116.

The fixed effector 204 is rotationally fixed relative to the body 200. In particular, the fixed effector 204 is attached to the first side 208A of the arm 206. The fixed effector 204 comprises one or more top pins 228 configured to extend at least partially into the extrudate 116. In particular, the fixed effector 204 includes a base 230 and an extendable arm 232 with a plurality of top pins 228 attached to an end of the extendable arm 232. In this way, movement of the extendable arm 232 from a retracted position to an extended position moves the plurality of top pins 228 into a top of the extrudate 116. The fixed effector 204 is configured to vertically engage the extrudate 116, after rotation of the extrudate 116 by the left and right rotational effectors 202A, 202B, to rotationally fix the extrudate 116 around the central longitudinal axis of the extrudate 116. The top pins 228 prevent the retraction of the first and second side pins 222A, 222B from negatively affecting orientation of the web angle of the extrudate 116. In particular, rotation of the extrudate 116 puts the first and second side pins 222A, 222B in a configuration that is not perpendicular to gravity, so there could be a tendency for the extrudate 116 to roll as the first and second side pins 222A, 222B are retracted. The top pins 228 do not rotate and as such remain vertical. Accordingly, once inserted into the extrudate 116, the top pins 228 allow the first and second side pins 222A, 222B to be retracted without causing a disturbance to the web angle orientation of the extrudate 116. The top pins 228 can be retracted or the extrudate 116 can fall off the top pins 228 vertically without affecting the web angle of the extrudate 116.

The head end assembly 128 is configured to linearly translate the extrudate 116 along the central longitudinal axis after engagement of the left and right rotational effectors 202A, 202B with the extrudate 116. In certain embodiments, the imaging device 132 is attached to the body 200 of the head end assembly 128. In particular, the imaging device 132 is attached to the second surface 208B of the arm 206. Accordingly, in such a configuration, the imaging device 132 is configured to translate concurrently with the end face of the extrudate 116. The imaging device 132 is configured to image an end face of the extrudate, and generate, during linear translation of the extrudate 116, at least one imaging output signal indicative of a rotational position of an end face 202 of the extrudate 116. In certain embodiments, the imaging device 132 may include at least one of a leveling device, a gimbal, and/or a gyroscope.

The head end assembly 128 further includes a sensor 234 attached to the first side 212A of the rotating plate 210. However, in other embodiments, the sensor 234 may be mounted to the first side 208A of the arm 206. The sensor 234 is configured to identify the leading end 118 of the wet extrudate material 112 for determining when the left and right rotational effectors 202A, 202B of the head end assembly 128 should extend and engage the wet extrudate material 112.

Figure 3A:
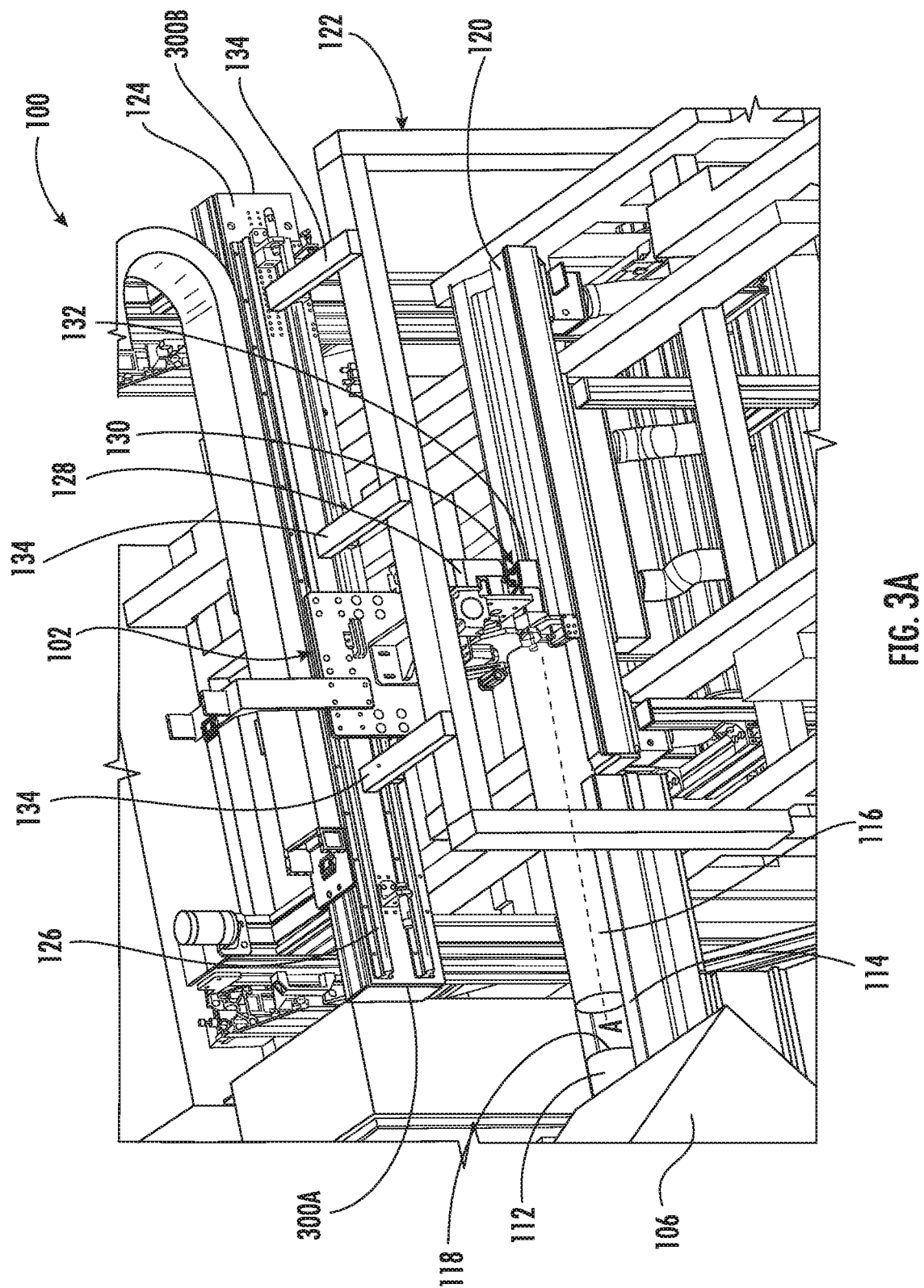
FIG. 3A is a perspective view of the extrusion system of FIGS. 1A-1C illustrating engagement of the extrudate handling system with an extrudate, the head end assembly of the extrudate handling system proximate a first end of a track of the extrusion system.

FIG. 3A is a perspective view of the extrusion system 100 of FIGS. 1A-1C illustrating an extrudate 116 engaged by the extrudate handling system 102. The head end assembly 128 of the extrudate handling system 102 is proximate a first end 300A of the track 126 of the extrusion system 100. As noted above, the head end assembly 128 engages a leading end 118 of the wet extrudate material 112 before the extrudate 116 is cut and formed by cutting the wet extrudate material 112. In particular, a linear actuator moves the head end assembly 128 on the track 126 toward the first end 300A of the track 126. As the head end assembly 128 approaches the leading end 118 of the extrudate, the sensor 234 determines the leading end 118 of the extrudate 116 (before the leading end 118 of the wet extrudate material contacts the head end assembly 128). The wet saw assembly 106 then cuts the wet extrudate material 112, and the head end assembly 128 linearly translates the extrudate 116 towards the second end 300B of the track 126.

Figure 3B:
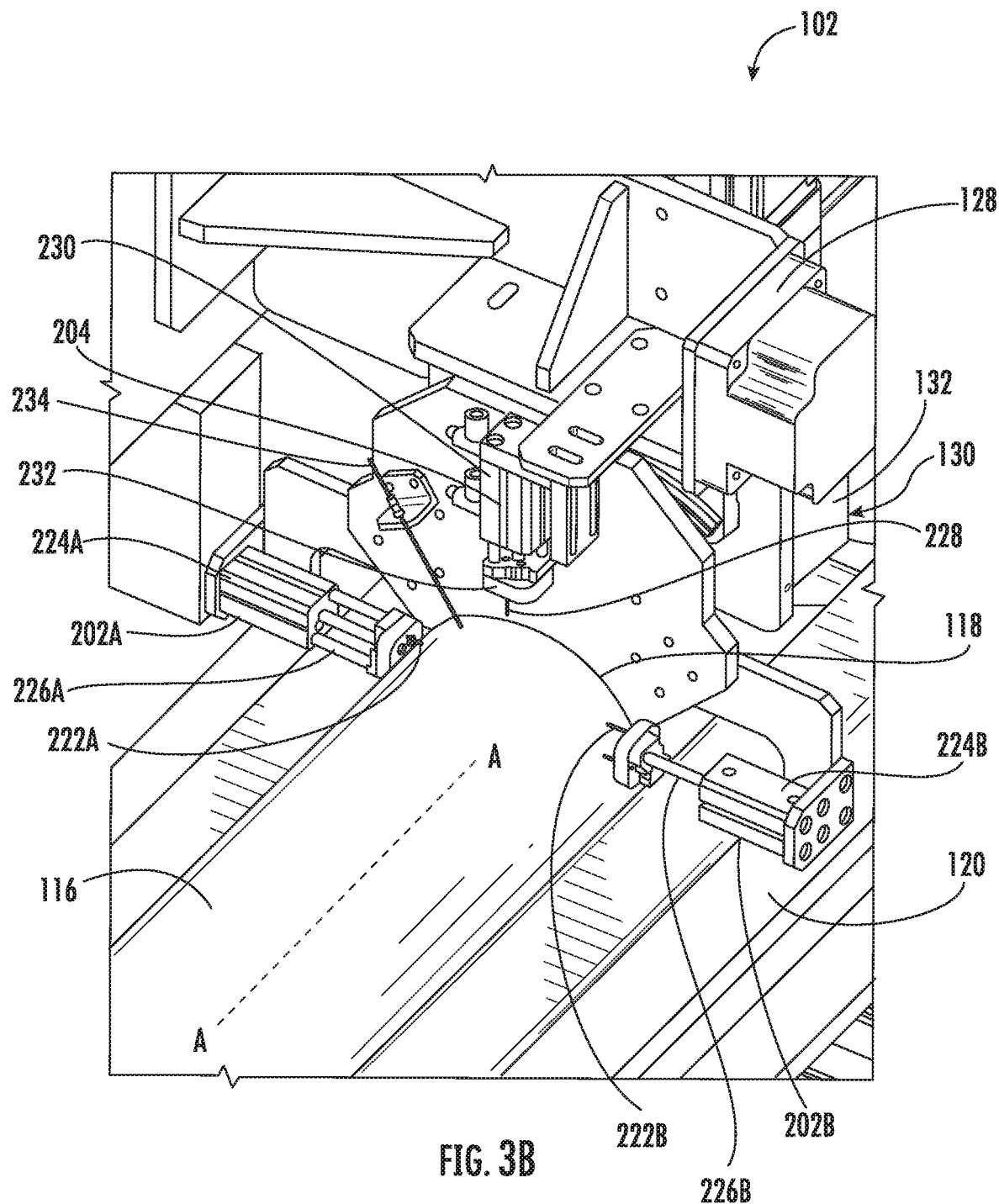
FIG. 3B is a perspective view of the extrusion system of FIGS. 1A-1C illustrating engagement of a rotational effector of the head end assembly with the extrudate and disengagement of the fixed effector of the head end assembly with the extrudate.

FIG. 3B is a perspective view of the extrusion system 100 of FIGS. 1A-1C illustrating engagement of a rotational effector 202A, 202B of the head end assembly 128 with the extrudate 116, and disengagement of the fixed effector 204 of the head end assembly 128 with the extrudate 116. Upon determining the leading end 118 of the wet extrudate material 112, the extendable arms 226A, 226B of the left and right rotational effectors 202A, 202B move from a retracted position to an extended position so that the side pins 222A, 222B of the left and right rotational effectors 202A, 202B engage (e.g., insert into) the left and right sides, respectively, of the wet extrudate material 112. The fixed effector 204 remains in the retracted position. Once the left and right rotational effectors 202A, 202B engage the wet extrudate material 112, the wet extrudate material 112 is cut by the wet saw assembly 106 (see FIGS. 1A-1B). In this way, the head end assembly 128 is able to control the extrudate 116 before the extrudate 116 has a chance to roll or otherwise disorient the web angle of the extrudate 116. In other words, because the side pins 222A, 222B are inserted into the left and right sides of the wet extrudate material 112 just prior to the extrudate 116 being cut from the wet extrudate material 112, the web angle of the extrudate 116 has not been given an opportunity to deviate significantly from the approximately vertical orientation as the wet extrudate material 112 exits the extrusion die 110 (see FIGS. 1A-1B). Controlling the extrudate 116 immediately is important because once cut, the extrudate 116 can spin significantly, causing deformation and/or deviation of the web angle of the extrudate 116 to an extent that may not be correctable.

Figure 3C:
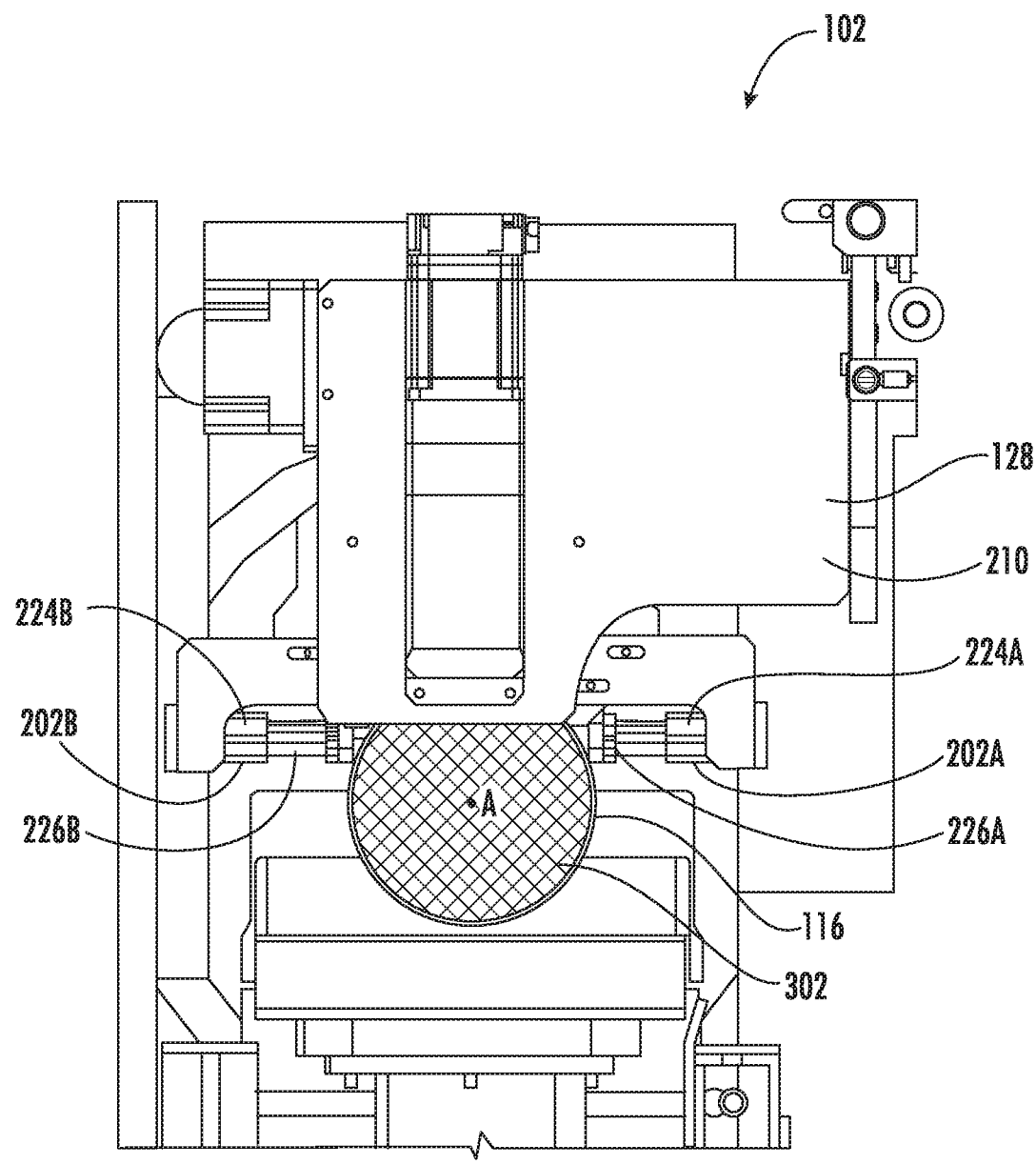
FIG. 3C is a front view of the extrudate handling system of FIGS. 2A-2C illustrating imaging of a web angle of the extrudate at an end of the extrudate by an imaging device of the extrudate handling system.

FIG. 3C is a front view of the extrudate handling system 102 of FIGS. 2A-2C illustrating imaging of a web angle of the extrudate 116 at an end face 302 of the extrudate 116 by an imaging device 132 (e.g., camera) of the extrusion system 100. For clarity, the imaging device 132 is hidden from view.

The head end assembly 128 moves from the first end 300A of the track 126 toward the second end 300B of the track 126 (see FIG. 3A). During linear translation of the extrudate 116 toward the second end 300B of the track 126, the imaging device 132 images the end face 302 of the extrudate 116, and generates at least one imaging output signal indicative of a rotational position of the end face 302 of the extrudate 116. The imaging device 132 and/or a processing device (e.g., computer) electronically analyzes the imaging output signal of the imaging device 132. In particular, the web angle of the end face 302 (i.e., the rows and/or columns of the cross-sectional matrix) of the extrudate 116 is analyzed with respect to a vertical and/or horizontal orientation (relative to gravity). The accuracy in analyzing the orientation of the extrudate 116 is increased because the imaging device 132 directly views the end face 302 of the extrudate 116 (as opposed to a surrogate like a reference line along an exterior of the extrudate, which may have a high degree of positional variability and may not accurately reflect web angle).

The output signal (e.g., image) is analyzed by the imaging device 132 and/or processing device to detect any deviation of the matrix from a vertical and/or horizontal orientation (relative to gravity) and electronically generate a corrective solution. Further, the processing device electronically receives data from the tray sensors 134 (e.g., inclinometer) regarding leveling data of the dryer tray 120 (relative to gravity). The deviation of the dryer tray 120 from level is also incorporated into a corrective rotational solution of the extrudate 116. The processing device evaluates the image from the imaging device 132 and/or the data from the tray sensors 134, and compares such data with a target range for alignment. In particular, the processing device compares the alignment of the cell structure of the end face 302 of the extrudate 116.

Figure 3D:
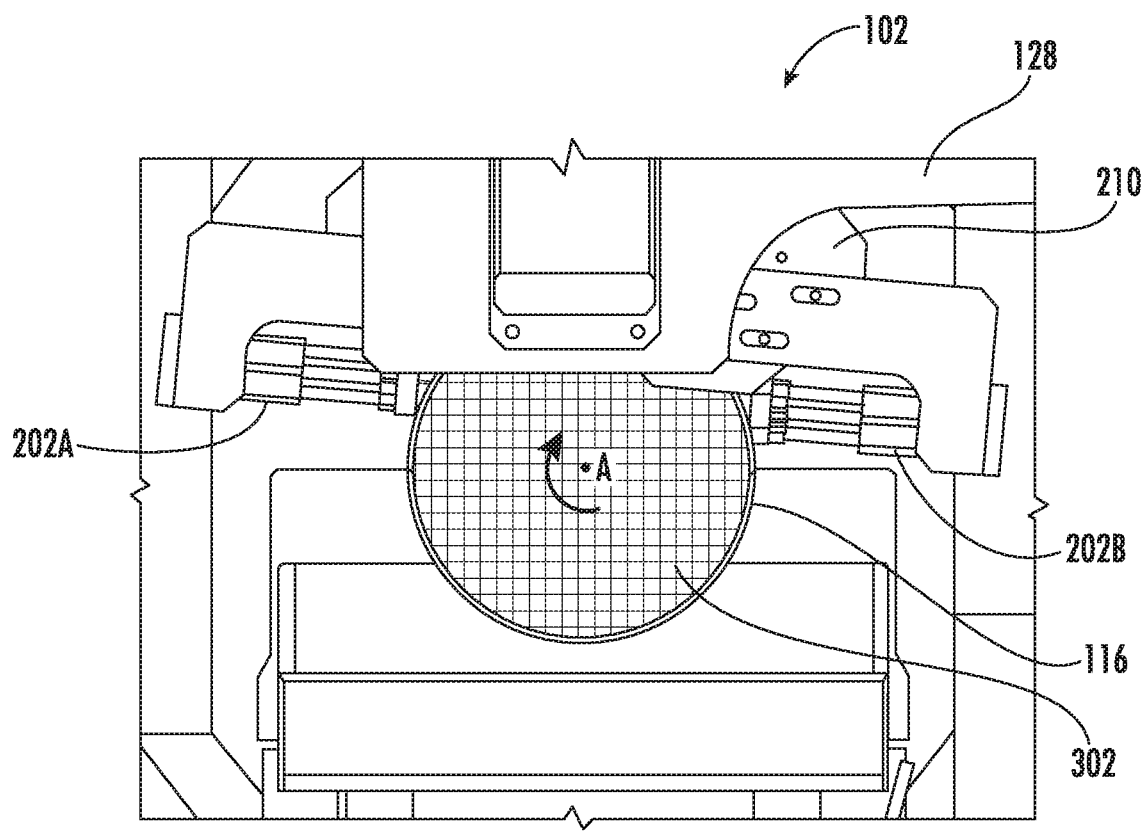
FIG. 3D is a front view of the extrudate handling system of FIGS. 2A-2C illustrating rotational adjustment of the web angle of the extrudate at the end of the extrudate by the rotational effector.

FIG. 3D is a front view of the extrudate handling system 102 of FIGS. 2A-2C illustrating rotational adjustment of the web angle of the extrudate 116 at the end face 302 of the extrudate 116 by the rotational effector 202A, 202B. During linear translation of the extrudate 116 toward the second end 300B of the track 126, based on the imaging device 132 and/or the tray sensors 134, the left and right rotational effectors 202A, 202B rotate the extrudate 116 about a longitudinal axis A-A of the extrudate 116 to vertically orient columns of the internal matrix of the extrudate 116 relative to gravity and/or to align an extrudate web angle of the extrudate 116 to a predetermined web angle relative to gravity. In certain embodiments, a servo driven rotation mechanism 211 rotates the output gear, which rotates the rotating plate 210 and thereby the left and right rotational effectors 202A, 202B of the head end assembly 128. The ability actively adjust the extrudate 116 to a target angle (which may incorporate tray tilt angle) is an improvement over previous systems, which only evaluated performance after the extrudate 116 was placed on the dryer tray 120. Instead, the extrudate handling system 102 adjusts each extrudate 116 and dryer tray 120 combination for optimum accuracy. Further, web angle measurement data can be analyzed for trends, and additional inputs can be incorporated into the web angle corrective solution to further improve accuracy. In certain embodiments, after adjustment of the extrudate 116, the imaging device 130 takes a second measurement to verify accuracy of the adjustment and/or for inclusion into future adjustment solutions.

Figure 3E:
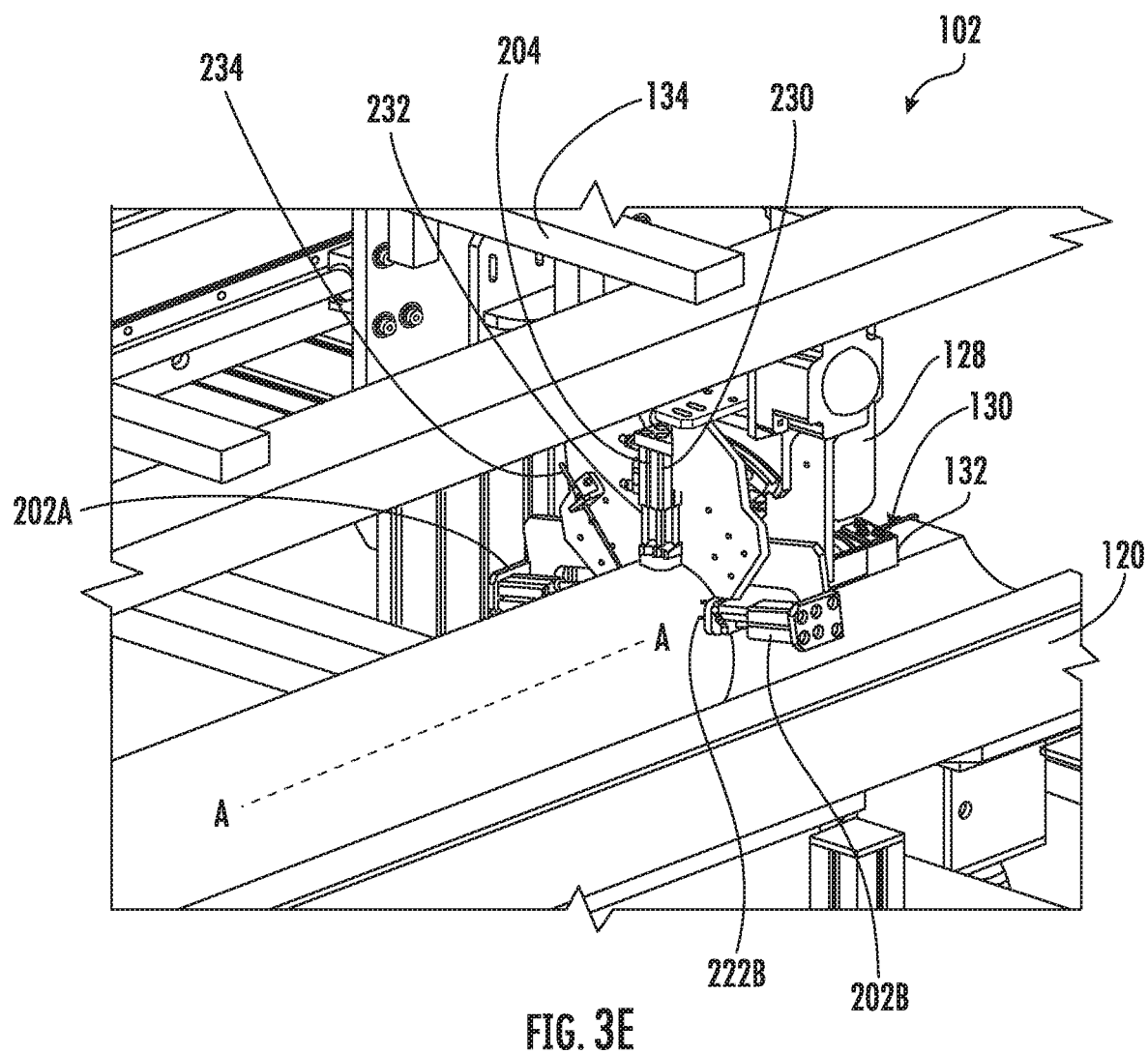
FIG. 3E is a perspective view of the extrudate handling system of FIGS. 2A-2C illustrating engagement of a rotational effector of the head end assembly with the extrudate and engagement of the fixed effector of the head end assembly with the extrudate.

FIG. 3E is a perspective view of the extrudate handling system 102 of FIGS. 2A-2C illustrating engagement of a rotational effector 202A, 202B of the extrudate handling system 102 with the extrudate 116 as well as engagement of the fixed effector 204 of the extrudate handling system 102 with the extrudate 116. During linear translation of the extrudate 116 toward the second end 300A of the track 126, after the extrudate 116 has been rotated to a preferred rotational position, the fixed effector 204 moves from a retracted position to an extended position to engage the top of the leading end 118 of the extrudate 116. Accordingly, the fixed effector 204 rotationally fixes the extrudate 116 in the preferred rotational position.

Figure 3F:
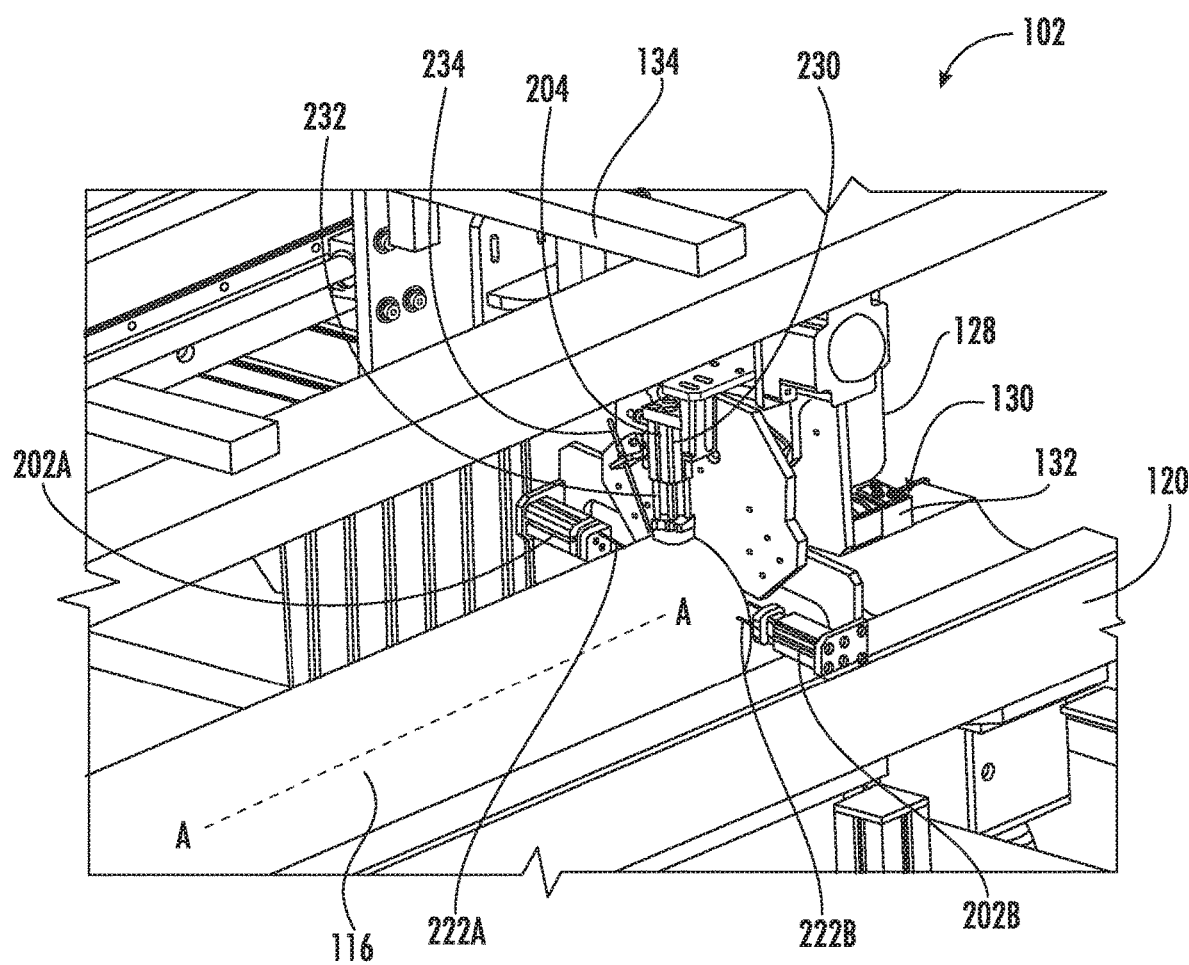
FIG. 3F is a perspective view of the extrudate handling system of FIGS. 2A-2C illustrating disengagement of a rotational effector of the head end assembly with the extrudate and engagement of the fixed effector of the head end assembly with the extrudate.

FIG. 3F is a perspective view of the extrudate handling system 102 of FIGS. 2A-2C illustrating disengagement of a rotational effector 202A, 202B of the extrudate handling system 102 from the extrudate 116 and engagement of the fixed effector 204 of the extrudate handling system 102 with the extrudate 116. Once the head end assembly 128 is moved to the second end 300B of the track 126, and the extrudate 116 is positioned over the dryer tray 120, the left and right rotational effectors 202A, 202B move from the extended position to the retracted position, thereby disengaging the left and right sides of the extrudate 116. The fixed effector 204 prevents any accidental rotation of the extrudate 116 while the side pins 222A, 222B of the left and right rotational effectors 202A, 202B disengage the extrudate 116.

Once the left and right rotational effectors 202A, 202B are disengaged, the extrudate 116 falls onto the dryer tray 120 and thereby disengages the top pins 228 of the fixed effector 204. In this way, the top pins 228 of the fixed effector 204 serve as a guide to maintain the rotational orientation of the extrudate 116 as the extrudate 116 is lowered onto the dryer tray 120.

In certain embodiments, the imaging device 132 images an end face 302 of the extrudate 116, and generates at least one second imaging output signal indicative of a rotational position of an end face 302 of the extrudate 116 after placement on the dryer tray 120 to ensure vertical and/or horizontal orientation of the web angle of the extrudate 116 (relative to gravity). In certain embodiments, a last predetermined number (e.g., five or however many desired) of web angle values are averaged and compared to a desired target value (i.e., the extrudate handling system 102 determines a difference between the average of the predetermined number of web angles to the desired target value). Based on the difference between actual and target values an additional input into the web angle correction solution is included (i.e., the extrudate handling system 102 generates additional input based on the difference between the average of the predetermined number of web angles to the desired target value for inclusion into a figure web angle correction solution). In other words, feedback is provided to the system for increased accuracy in future iterations. There may be instances in which the target web angle is desired to be other than zero, and the disclosed method and apparatus have the capability to align the web angle of the extrudate 116 to any desired angle from zero (vertical) to +/−45 degrees.

Compared with other systems, the extrudate handling system 102 reduces the deviation from the targeted web angle of the extrudate 116 (e.g., from +/−2.0 degrees to +/−0.5 degrees). The extrudate handling system 102 provides improved (more accurate) web angle, resulting in improved yield as a higher percentage of extrudate maintain acceptable shape and dimensional characteristics after drying. As the extrudate handling system 102 provides the measurement and rotation during translation of the extrudate 116, the extrudate handling system 102 results in increased feed rates, scrap reduction (as any angular issues are addressed before placement on the dryer tray), and/or labor reduction (e.g., as the system is automated and minimizes manual input).

Figure 4:
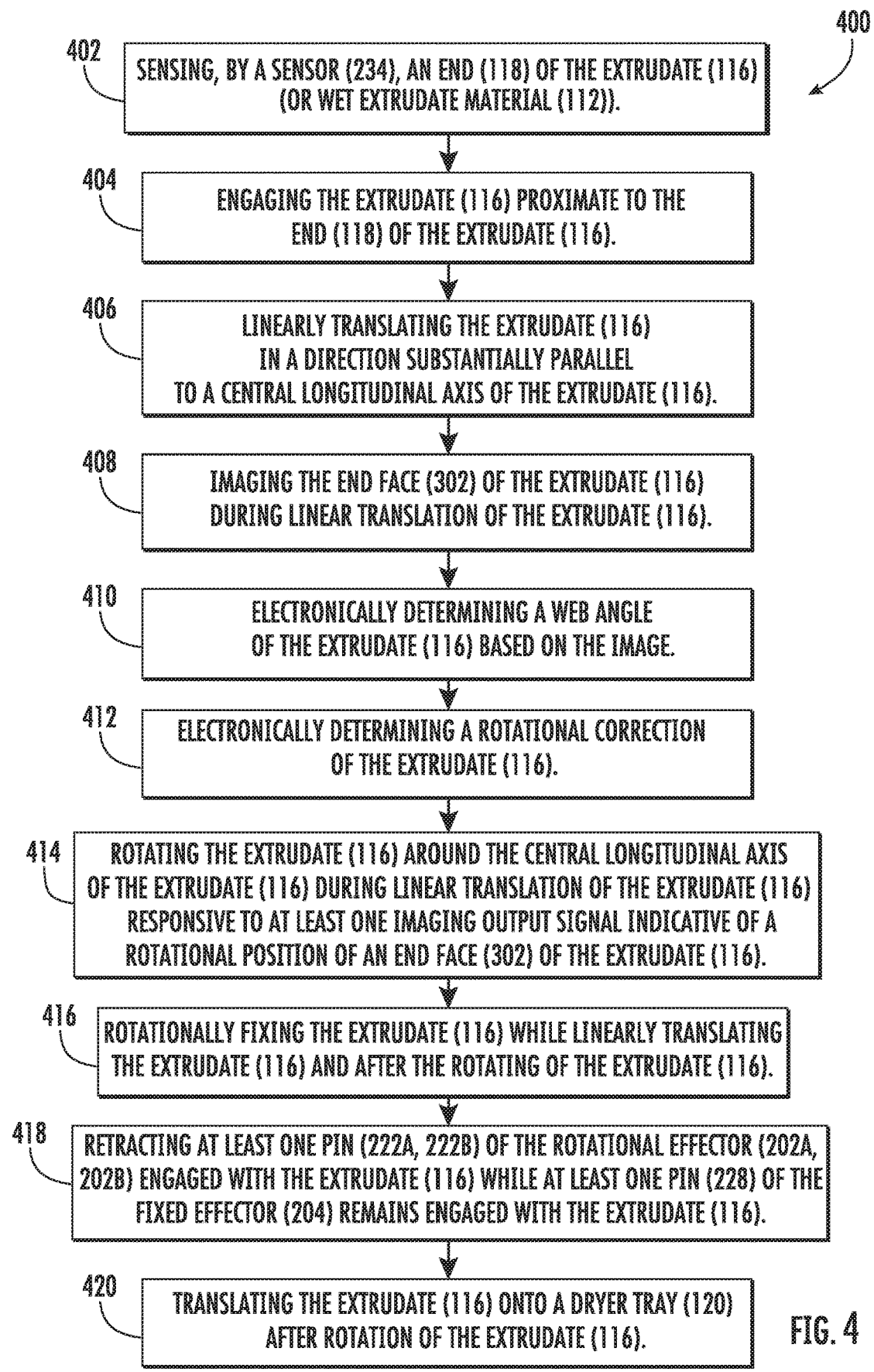
FIG. 4 is a flowchart illustrating steps for handling an extrudate using the extrusion system of FIGS. 1A-1C.

FIG. 4 is a flowchart illustrating steps 400 for handling an extrudate 116 using the extrusion system 100 of FIGS. 1A-1C. In step 402, a sensor 234 senses an end 118 of the extrudate 116 (or wet extrudate material 112). In step 404, the extrudate 116 is engaged proximate to the end 118 of the extrudate 116.

In step 406, the extrudate 116 is linearly translated in a direction substantially parallel to a central longitudinal axis of the extrudate 116. In step 408, the end face 302 of the extrudate 116 is imaged during linear translation of the extrudate 116. In step 410, a web angle of the extrudate 116 is electronically determined based on the image. In step 412, a rotational correction of the extrudate 116 is electronically determined.

In step 414, the extrudate 116 is rotated around the central longitudinal axis of the extrudate 116 during linear translation of the extrudate 116 responsive to at least one imaging output signal indicative of a rotational position of an end face 302 of the extrudate 116. In particular, the extrudate 116 is rotated responsive to the determined rotational correction. In certain embodiments, the extrudate 116 is rotated to vertically orient columns of an internal matrix of the extrudate 116 and/or to align an extrudate web angle of the extrudate 116 to a predetermined web angle. In certain embodiments, the extrudate 116 is rotated responsive to at least one sensing output signal indicative of a tilt of the dryer tray 120.

In step 416, the extrudate 116 is rotationally fixed while linearly translating the extrudate 116 and after the rotating of the extrudate 116. In step 418, at least one pin 222A, 222B of a rotational effector 202A, 202B engaged with the extrudate 116 is retracted while at least one pin 228 of a fixed effector 204 remains engaged with the extrudate 116. In step 420, the extrudate 116 is translated onto a dryer tray 120 after rotation of the extrudate 116.

In one set of embodiments disclosed herein, an extrudate handling system comprises: at least one imaging device configured to: image an end face of an extrudate, and generate, during linear translation of the extrudate, at least one imaging output signal indicative of a rotational position of the end face of the extrudate, and at least one rotational effector configured to, during translation of the extrudate, rotate the extrudate around a central longitudinal axis of the extrudate responsive to the at least one imaging output signal. In some embodiments, the at least one rotational effector is configured to rotate the extrudate to vertically orient columns of an internal matrix of the extrudate. In some embodiments, the at least one rotational effector is configured to rotate the extrudate to align an extrudate web angle of the extrudate to a predetermined web angle. In some embodiments, the extrudate handling system is configured to: determine a difference between an average of a predetermined number of web angles to a desired target value, and generate additional input based on the difference for inclusion into a future web angle correction solution. In some embodiments, the extrudate handling system is configured to linearly translate the extrudate onto a dryer tray; in some of these embodiments, the extrudate handling system further comprises at least one tray sensor configured to sense a tilt of the dryer tray and generate at least one sensing output signal indicative of the tilt of the dryer tray, wherein the at least one rotational effector is configured to, during translation of the extrudate, rotate the extrudate around a central longitudinal axis of the extrudate responsive to the at least one sensing output signal. In some embodiments, the extrudate comprises a ceramic material. In some embodiments, the at least one imaging device is further configured to translate concurrently with the end face of the extrudate. In some embodiments, the imaging device includes at least one of a leveling device, a gimbal, or a gyroscope. In some embodiments, the extrudate handling system further comprises a head end assembly comprising a body linearly translatable along a track and rotationally fixed relative to the track, wherein the at least one rotational effector is rotationally movable relative to the body; in some of these embodiments, the at least one rotational effector comprises at least one pin that extends at least partially into the extrudate, and in other of these embodiments, he head end assembly further comprises the imaging device, and the imaging device is attached to the body.

In another set of embodiments disclosed herein, an extrudate handling system comprises: a head end assembly comprising: a body linearly translatable along a track and rotationally fixed relative to the track; at least one rotational effector rotationally movable relative to the body and configured to rotate an extrudate around a central longitudinal axis of the extrudate, and a fixed effector rotationally fixed relative to the body and configured to engage the extrudate, after rotation of the extrudate by the at least one rotational effector, to rotationally fix the extrudate around the central longitudinal axis of the extrudate; wherein the head end assembly is configured to linearly translate the extrudate along the central longitudinal axis after engagement of the at least one rotational effector with the extrudate. In some of these embodiments, the at least one rotational effector is configured to rotate the extrudate to vertically orient columns of an internal matrix of the extrudate. In some of these embodiments, the at least one rotational effector is configured to rotate the extrudate to align an extrudate web angle of the extrudate to a predetermined web angle. In some of these embodiments, the extrudate handling system is configured to: determine a difference between an average of a predetermined number of web angles to a desired target value, and generate additional input based on the difference for inclusion into a future web angle correction solution. In some of these embodiments, the extrudate handling system is configured to linearly translate the extrudate onto a dryer tray; in some of these embodiments, the extrudate handling system further comprises at least one tray sensor configured to sense a tilt of the dryer tray and generate at least one sensing output signal indicative of the tilt of the dryer tray, wherein the at least one rotational effector is configured to, during translation of the extrudate, rotate the extrudate around a central longitudinal axis of the extrudate responsive to the at least one sensing output signal. In some of these embodiments, the extrudate comprises a ceramic or ceramic-forming material. In some of these embodiments, the extrudate handling system further comprises an air bearing surface over which the extrudate linearly translates. In some of these embodiments, the at least one rotational effector comprises a left rotational effector configured to engage a left side of the extrudate and a right rotational effector configured to engage a right side of the extrudate, and wherein the left rotational effector and the right rotational effector are oriented toward one another. In some of these embodiments, the at least one rotational effector comprises at least one pin configured to extend at least partially into the extrudate. In some of these embodiments, the fixed effector is configured to vertically engage the extrudate. In some of these embodiments, the fixed effector comprises a pin configured to extend at least partially into the extrudate. In some of these embodiments, the extrudate handling system further comprises at least one imaging device configured to: image an end face of the extrudate, and generate, during linear translation of the extrudate, at least one imaging output signal indicative of a rotational position of the end face of the extrudate; in some of these embodiments, the head end assembly further comprises the at least one imaging device attached to the body.

In yet another set of embodiments disclosed herein, a method of handling an extrudate comprises: linearly translating the extrudate in a direction substantially parallel to a central longitudinal axis of the extrudate, and rotating the extrudate around the central longitudinal axis of the extrudate during linear translation of the extrudate responsive to at least one imaging output signal indicative of a rotational position of an end face of the extrudate. In some of these embodiments, the rotating the extrudate includes rotating the extrudate to vertically orient columns of an internal matrix of the extrudate. In some embodiments, the rotating the extrudate includes rotating the extrudate to align an extrudate web angle of the extrudate to a predetermined web angle. In some embodiments, the method further comprises determining, by an extrudate handling system, a difference between an average of a predetermined number of web angles to a desired target value, and generating, by the extrudate handling system, additional input based on the difference for inclusion into a future web angle correction solution. In some embodiments, the method further comprises translating the extrudate onto a dryer tray after the rotating of the extrudate; in some of these embodiments, the rotating the extrudate includes rotating the extrudate responsive to at least one sensing output signal indicative of a tilt of the dryer tray. In some embodiments, the method further comprises: imaging the end face of the extrudate during linear translation of the extrudate, and electronically determining a web angle of the extrudate; in some of these embodiments, the method further comprises electronically determining a rotational correction of the extrudate; in some of these embodiments the rotating of the extrudate is responsive to the determined rotational correction. In some of these embodiments, the method further comprises: sensing, by a sensor, an end of the extrudate, and engaging the extrudate proximate to the end of the extrudate. In some of these embodiments, the method further comprises rotationally fixing the extrudate while linearly translating the extrudate and after the rotating of the extrudate. In some of these embodiments, the method further comprises retracting at least one pin of a rotational effector engaged with the extrudate while at least one pin of a fixed effector remains engaged with the extrudate.

It will be apparent to those skilled in the art that various modifications and variations can be made without departing from the spirit or scope of the invention.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An extrudate handling system for positioning an extrudate segment on a dryer tray after cutting of the extrudate segment from wet extrudate material, the system comprising:
    at least one imaging device configured to:
        image an end face of the extrudate segment prior to resting of the extrudate segment on the dryer tray; and
        generate, during linear translation of the extrudate segment and prior to resting of the extrudate segment on the dryer tray, at least one imaging output signal indicative of a rotational position of the end face of the extrudate segment; and
    at least one rotational effector configured to, during translation of the extrudate segment and prior to resting of the extrudate segment on the dryer tray, rotate the extrudate segment around a central longitudinal axis of the extrudate segment and align the extrudate segment to have a selected orientation, responsive to the at least one imaging output signal.

2. The extrudate handling system of claim 1, wherein the at least one rotational effector is configured to rotate the extrudate segment to vertically orient columns of an internal matrix of the extrudate segment.

3. The extrudate handling system of claim 1, wherein the at least one rotational effector is configured to rotate the extrudate segment to align an extrudate web angle of the extrudate segment to a predetermined web angle.

4. The extrudate handling system of claim 1, wherein the extrudate handling system is configured to:
    determine a difference between an average of a predetermined number of web angles to a desired target value; and
    generate additional input based on the difference for inclusion into a future web angle correction solution.

5. The extrudate handling system of claim 1, wherein the extrudate handling system is configured to linearly translate the extrudate segment onto the dryer tray.

6. The extrudate handling system of claim 1,
    further comprising at least one tray sensor configured to sense a tilt of the dryer tray and generate at least one sensing output signal indicative of the tilt of the dryer tray;
    wherein the at least one rotational effector is configured to, during translation of the extrudate segment, rotate the extrudate segment around a central longitudinal axis of the extrudate segment responsive to the at least one sensing output signal.

7. The extrudate handling system of claim 1, wherein the at least one imaging device is further configured to translate concurrently with the end face of the extrudate segment.

8. The extrudate handling system of claim 1, further comprising a head end assembly comprising a body linearly translatable along a track and rotationally fixed relative to the track, wherein the at least one rotational effector is rotationally movable relative to the body.

9. The extrudate handling system of claim 8, wherein the at least one rotational effector comprises at least one pin that extends at least partially into the extrudate segment.

10. The extrudate handling system of claim 8, wherein the head end assembly further comprises the imaging device, and the imaging device is attached to the body.

11. An extrudate handling system for handling an extrudate segment having a central longitudinal axis after cutting of the extrudate segment from wet extrudate material, the system comprising:
    a head end assembly comprising:
        a body linearly translatable along a track and rotationally fixed relative to the track;
        at least one rotational effector configured to linearly translate with the body relative to the track, the at least one rotational effector being rotationally movable relative to the body and configured to rotate the extrudate segment around the central longitudinal axis of the extrudate segment; and a fixed effector configured to linearly translate with the body relative to the track, the fixed effector being rotationally fixed relative to the body and configured to engage the extrudate segment, after rotation of the extrudate segment by the at least one rotational effector, to rotationally fix the extrudate segment around the central longitudinal axis of the extrudate segment;

wherein the body is linearly translatable in a direction parallel to the central longitudinal axis of the extrudate segment, and the head end assembly is configured to linearly translate the extrudate segment along the central longitudinal axis after engagement of the at least one rotational effector with the extrudate segment.

12. The extrudate handling system of claim 11, wherein the at least one rotational effector is configured to rotate the extrudate segment to vertically orient columns of an internal matrix of the extrudate segment.

13. The extrudate handling system of claim 11, wherein the at least one rotational effector is configured to rotate the extrudate segment to align an extrudate web angle of the extrudate segment to a predetermined web angle.

14. The extrudate handling system of claim 11, wherein the extrudate handling system is configured to:

determine a difference between an average of a predetermined number of web angles to a desired target value; and generate additional input based on the difference for inclusion into a future web angle correction solution.

15. The extrudate handling system of claim 11, wherein the extrudate handling system is configured to linearly translate the extrudate segment onto a dryer tray.

16. A method of handling an extrudate segment having a central longitudinal axis after cutting of the extrudate segment from wet extrudate material, the method comprising:

linearly translating the extrudate segment in a direction substantially parallel to the central longitudinal axis of the extrudate segment; and rotating the extrudate segment around the central longitudinal axis of the extrudate segment and aligning the extrudate segment to have a selected orientation during linear translation of the extrudate segment, and prior to resting of the extrudate segment on a dryer tray, responsive to at least one imaging output signal obtained from an end face of the extrudate segment prior to resting of the extrudate segment on the dryer tray and being indicative of a rotational position of an end face of the extrudate segment.

17. The method of claim 16, wherein the rotating the extrudate segment includes rotating the extrudate segment to vertically orient columns of an internal matrix of the extrudate segment.

18. The method of claim 16, wherein the rotating the extrudate segment includes rotating the extrudate segment to align an extrudate web angle of the extrudate segment to a predetermined web angle.

19. The method of claim 16, further comprising determining, by an extrudate handling system, a difference between an average of a predetermined number of web angles to a desired target value; and generating, by the extrudate handling system, additional input based on the difference for inclusion into a future web angle correction solution.

20. The method of claim 16, further comprising translating the extrudate segment onto a dryer tray after the rotating of the extrudate segment.

21. The extrudate handling system of claim 11, wherein the fixed effector comprises one or more pins configured to extend into the extrudate segment to rotationally fix the extrudate segment around the central longitudinal axis of the extrudate segment.

* * * * *